United States Patent
Wang et al.

(10) Patent No.: US 9,105,087 B2
(45) Date of Patent: Aug. 11, 2015

(54) SYSTEM FOR UNCOLLIMATED DIGITAL RADIOGRAPHY

(71) Applicant: Lawrence Livermore National Security, LLC, Livermore, CA (US)

(72) Inventors: Han Wang, Cypress, CA (US); James M. Hall, Livermore, CA (US); James F. McCarrick, Dublin, CA (US); Vincent Tang, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 13/945,351

(22) Filed: Jul. 18, 2013

(65) Prior Publication Data
US 2014/0021357 A1    Jan. 23, 2014

Related U.S. Application Data

(60) Provisional application No. 61/674,223, filed on Jul. 20, 2012.

(51) Int. Cl.
*G01T 1/20* (2006.01)
*G06T 5/00* (2006.01)

(52) U.S. Cl.
CPC .............. *G06T 5/003* (2013.01); *G01T 1/2006* (2013.01); *G06T 2207/10116* (2013.01); *G06T 2207/20076* (2013.01); *G06T 2207/30164* (2013.01)

(58) Field of Classification Search
USPC ...................................... 250/363.01; 382/255
See application file for complete search history.

(56) References Cited

U.S. PATENT DOCUMENTS

| | | | |
|---|---|---|---|
| 7,046,836 B2 * | 5/2006 | Shinbata | 382/132 |
| 7,570,792 B2 * | 8/2009 | Takahashi | 382/132 |
| 2003/0048873 A1 * | 3/2003 | Dinten et al. | 378/108 |

(Continued)

OTHER PUBLICATIONS

Author: H. Wang, V. Tang, J. F. McCarrick, S. Moran, Title: Reconstruction Algorithm for Point Source Neutron Imaging through Finite Thickness Scintillator, Date: Jan. 24, 2012, Publisher: Nuclear Instruments and Methods in Physics Research Section A.*

(Continued)

*Primary Examiner* — David J Makiya
*Assistant Examiner* — Taeho Jo
(74) *Attorney, Agent, or Firm* — Harness, Dickey & Pierce, PLC

(57) ABSTRACT

The inversion algorithm based on the maximum entropy method (MEM) removes unwanted effects in high energy imaging resulting from an uncollimated source interacting with a finitely thick scintillator. The algorithm takes as input the image from the thick scintillator (TS) and the radiography setup geometry. The algorithm then outputs a restored image which appears as if taken with an infinitesimally thin scintillator (ITS). Inversion is accomplished by numerically generating a probabilistic model relating the ITS image to the TS image and then inverting this model on the TS image through MEM. This reconstruction technique can reduce the exposure time or the required source intensity without undesirable object blurring on the image by allowing the use of both thicker scintillators with higher efficiencies and closer source-to-detector distances to maximize incident radiation flux. The technique is applicable in radiographic applications including fast neutron, high-energy gamma and x-ray radiography using thick scintillators.

28 Claims, 15 Drawing Sheets

(56) References Cited

U.S. PATENT DOCUMENTS

2003/0182246 A1* 9/2003 Johnson et al. .................. 705/76
2012/0019510 A1* 1/2012 Bingham et al. .............. 345/419

OTHER PUBLICATIONS

Author: Stephen J. Wernecke, Title: Maxcimum Entropy Image Reconstruction, Date: Apr. 1977, Publisher:IEEE Transactions on Computers, vol. C-26, No. 4.*

Author: A Jannetta et al., Title: Advanced deconvolution techniques and medical radiography, Date: Oct. 2005, Publisher:School of Computing, Engineering and Information Sciences and in collaboration with the Regional Medical Physics Department at Newcastle General Hospital.*

Author: Adrian Leslie Jannetta, Title: Mammographic image restoration using maximum entropy deconvolution, Date: May 24, 2005, Publisher:Physics. med.*

Wang, et al. (2012), "A Hybrid Analytical Model for Radiography Cone Beam Effects", LLNL-PROC-574692, Lawrence Livermore National Laboratory, 8 pages.

Wang, et al. (2012), "Reconstruction Algorithm for Point Source Neutron Imaging Through Finite Thickness Scintillator", Nuclear Instruments and Methods in Physics Research Section a—Accelerators Spectrometers Detectors and Associated Equipment 694: 294-301.

Dicken, et al. (2010), "Position Determiination of Scatter Signatures—A Novel Sensor Geometry", Talanta 83(2): 431-435.

Wadeson, et al. (2010), "Scatter in an Uncollimated X-Ray CT Machine Based on a Geant4 Monte Carlo Simulation", Proceedings of SPIE—The International Society for Optical Engineering 7622: 76223E.

Van Uytven, et al. (2007), "An Iterative Three-Dimensional Electron Density Imaging Algorithm Using Uncollimated Comptin Scattered X-Rays from a Polyenergetic Primary Pencil Beam", Medical Physics 34(1): 256-265.

Gorshkov, et al. (2005), "Tomographic Diagnosis on Basis of Roentgenic Non-Collimated Radiation", Tyazheloe Mashinostroenie(4): 6-7.

Kojima, et al. (2004), "Accurate Scatter Correction for Transmission Computed Tomography Using an Uncollimated Line Array Source", Annals of Nuclear Medicine 18(1): 45-50.

Gorshkov (1999), "An Uncollimated Scattered-Radiation Tomograph", Russian Journal of Nondestructive Testing 35(9): 695-700.

Gorshkov, et al. (1998) "Radiation Tomography with Non-Collimated Backscattered Radiation", Russian Journal of Nondestructive Testing 34(9) 686-695.

Manglos, et al. (1991), "Cone-Beam Transmission Computed Tomography for Nonuniform Attenuation Compensation of SPECT Images", Journal of Nuclear Medicine 32(9): 1813-1820.

Devishev, et al. (1978), "Computer Reconstruction of Scintigraphic Images", Biomedical Engineering 12(6): 298-302.

* cited by examiner

SYSTEM FOR UNCOLLIMATED DIGITAL RADIOGRAPHY

CROSS-REFERENCE TO RELATED APPLICATIONS

This application claims the benefit of U.S. Provisional Application No. 61/674,223, filed on Jul. 20, 2012. The entire disclosure of the above application is incorporated herein by reference.

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

FIELD

The present disclosure relates generally to radiography and digital imaging, as for use in nondestructive testing and other applications. More particularly the disclosure relates to high energy imaging systems, such as fast neutron imaging systems, and to computer-implemented image processing techniques to improve clarity of the image.

BACKGROUND

This section provides background information related to the present disclosure which is not necessarily prior art.

Fast neutron imaging is an active area of research as it offers unique imaging modalities compared with traditional x-ray and thermal neutron imaging, such as the ability to nondestructively discern features in low-Z objects shielded by thick high-Z materials. In digital fast neutron imaging for example, fast neutrons are passed through a target onto a scintillator whose light is collected by a CCD camera. Scintillator thicknesses of multiple centimeters are required to detect MeV level neutrons with viable efficiencies. Collimated neutron beams are thus typically used because uncollimated and divergent beams will induce a cone beam effect in the resulting image due to both the finite thickness of the target and the scintillator itself. However, collimating a neutron source through increased source distance-to-target drastically reduces the neutron flux incident on the target and results in significantly longer imaging times.

SUMMARY

This section provides a general summary of the disclosure, and is not a comprehensive disclosure of its full scope or all of its features.

This disclosure presents a solution that allows uncollimated neutron imaging to be used by removing the cone beam effect caused by the finite thickness of the scintillator via computer-implemented post-processing imaging reconstructions. The technique advantageously exploits a maximum entropy method (MEM) algorithm that minimizes artifacts by explicitly making the reconstructed image as noiseless as possible.

Adding a Bayesian prior to the reconstruction further improves quality because it changes the default image from uniformly flat to the specified prior. For a spherical source which does not impart uniform neutron flux over the entire scintillator, the introduction of the correct Bayesian prior reduces artifacts and improves contrast. This improvement is especially prominent in the peripherals of the image.

In this disclosure, we describe our MEM based computer-implemented technique and apparatus for removing the cone beam effect, and illustrate how to apply the algorithm to a simulated fast neutron radiography image as a proof of concept. The algorithm is able to remove the part of the cone beam effect in the simulated image caused by the thick scintillator. With the help of our disclosed algorithm, the reconstructed image appears as if taken with an infinitesimally thin scintillator (ITS), and thus with cone beam blurring being substantially removed.

In accordance with the disclosed techniques the system for uncollimated digital radiography employs a processor-implemented image deblurring apparatus to deblur and clarify an observed image produced by high energy radiation source that projects a substantially conical beam through a target and onto a scintillator, the scintillator when irradiated without target producing an observed background image. The image deblurring apparatus thus includes a processor programmed to generate a probability transfer matrix by employing a Monte-Carlo simulation based on the scintillator-source geometry. The apparatus further includes a processor programmed to process the observed background image to generate a Bayesian prior. In accordance with the disclosed technique a processor is programmed to use the probability transfer matrix and the Bayesian prior to perform a maximum entropy method reconstruction of the observed image to thereby generate a reconstructed image.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

Example embodiments will now be described more fully with reference to the accompanying drawings.

DETAILED DESCRIPTION

Introduction

Figure 14:
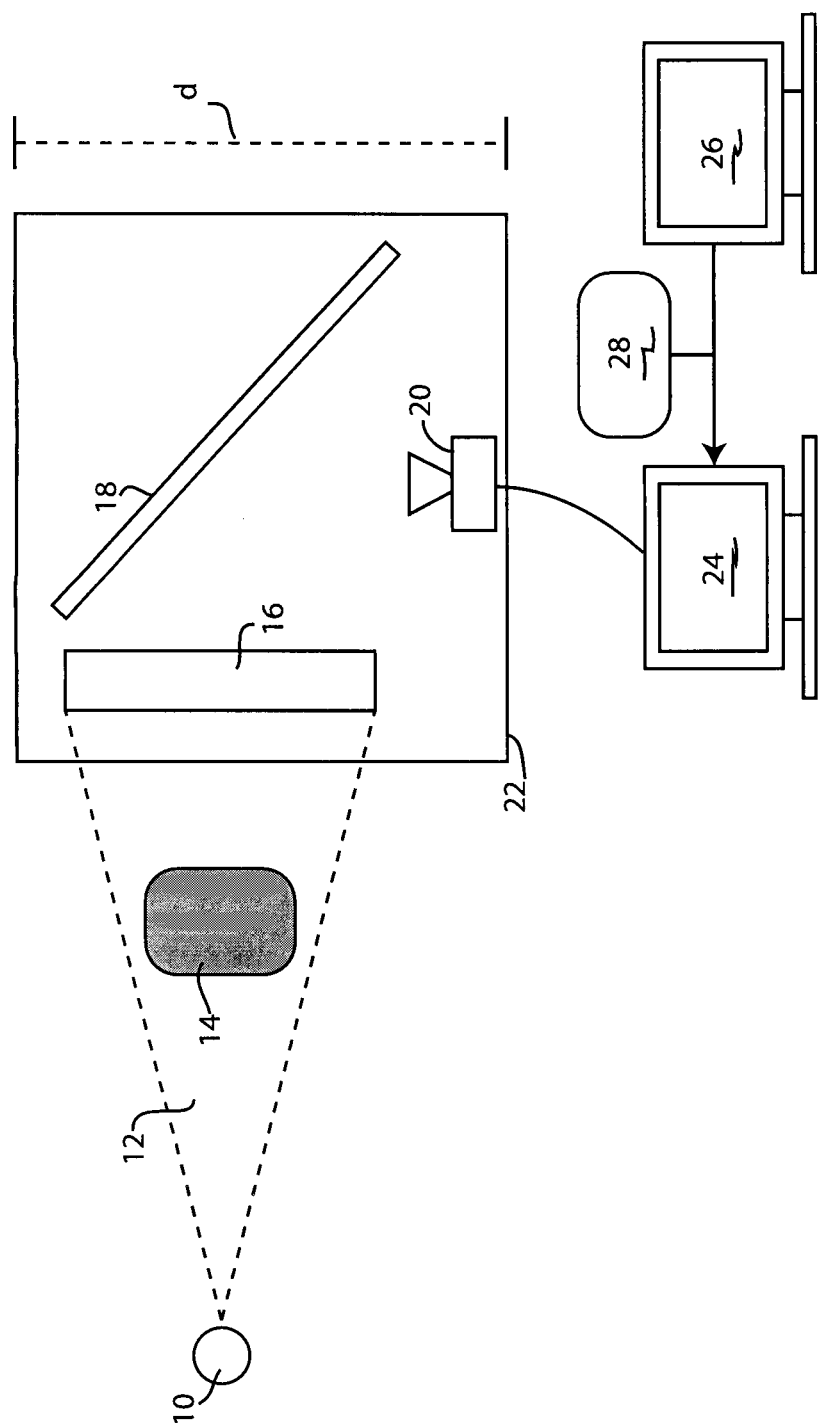
FIG. 14 is a diagrammatic illustration of an exemplary neutron beam radiography system, useful for understanding the basic techniques used in high energy imaging.

Before providing a detailed explanation of the system for uncollimated digital radiography, the following brief summary introduction may be helpful. Refer to FIG. 14.

To begin, an object of interest 14 is placed within the conical beam 12 of a radiating energy source 10, and an image is thus generated in the scintillator 16. In real-world applications, the scintillator has a finite thickness and this thickness together with the conical shape of the beam and other effects causes blurring when the image is viewed by a suitable image capturing apparatus such as a CCD camera or CCD array 20. The scintillator 16 and camera 20 are disposed within a light-proof enclosure 22 with a mirror 18 positioned in the enclosure, allowing the camera to be placed off-axis from the scintillator 16. The energy source 10 may be a CF-252 point source, which has the advantage of continuously producing a neutron beam from a relatively small package. The enclosure 22 can have a nominal dimension d on the order of about 1 meter, making the entire instrument readily portable.

The CCD camera 20 is connected to a data input port of computer workstation 24, which includes a display for rendering the captured image after being processed according to the techniques discussed below to remove or substantially reduce the blurring effects by performing computer image processing. If desired a remote server computer 26 can supply pre-computed scintillator response model(s) 28 as will be more fully described below.

As noted, the observed image is seen by the CCD camera through a thick scintillator [TS]. The computer processes this observed image, rendering it as if it were seen through an infinitesimally thin scintillator. The computer applies a transform to the TS image by inverting a linear matrix, [A]. Essentially if y is the TS image and x is the ITS image, the linear equation is simply:

$$Ax=y.$$

In real world situations, there is also an additive noise component $\epsilon$; thus the above relationship is more accurately stated:

$$Ax=y+\epsilon \text{ where } \epsilon \sim N(0, \sigma I_{MN}).$$

Note that noise is modeled in the computer to include a tuning parameter $\sigma$.

The above linear equation, while easy to express is ill posed and difficult to solve. Thus the preferred computer algorithm uses a maximum entropy method MEM technique for finding an approximate solution. The MEM technique replaces the Ax=y equation with one that is solvable, namely:

$$\operatorname{argmax} S(x_1, \ldots, x_{MN}) = -\sum_i p_i \log\left(\frac{p_i}{b_i}\right)$$

$$\text{s.t.} \sum_{i=1}^{MN} \frac{\left(y_i - \sum_i A_{ij} x_j\right)^2}{\sigma} \leq MN$$

where $$p_i = \frac{x_i}{\sum_j x_j}$$

The MEM algorithm requires several inputs: A, y, $\sigma$ and b, where A is the probability transfer matrix that will be discussed below, y is the observed image (from the thick scintillator), $\sigma$ is a tuning factor to model the additive noise and b is the background image. The background image is the image from the scintillator when there is zero information (no target, but only light produced when the scintillator is hit with the neutron beam).

The probability transfer matrix A represents the geometry of the setup, where a cone-shaped neutron beam passes through the target object(s) and produces illumination in a thick scintillator in the near field of the beam (e.g., source detector distance is within one order of magnitude compared to the detector (scintillator) thickness). Entry $A_{ij}$ in A represents the probability a neutron incident in voxel i will contribute to light-output in voxel j.

The background image is generated from actual observed background image data and thus contains some information about the cone beam effect.

The MEM algorithm operates on the observed image data y (from the thick scintillator TS) represented in vector form. Essentially the two dimensional M by N array of the scintillator image is represented as a vector 1 . . . MN. The actual MEM algorithm is essentially doing two things simultaneously. It is maximizing the Shannon entropy, which has the effect of flattening the image (to remove the cone beam effect) and suppressing noise. Simultaneously it is enforcing the constraint that the resulting output, after transform by A, remains statistically similar to the observed image.

To achieve these concurrent goals, the MEM algorithm needs some further ingredients. It needs the Bayesian prior representation of the background image. It needs the Bayesian prior for each cell in the image. The MEM algorithm also needs to be given the linear scintillator model A.

The Bayesian prior b for each cell is determined by starting with the observed background image and by applying a smoothing algorithm to it. The preferred smoothing algorithm being Residual Boosted-Support Vector Regression RB-SVR. It would also be possible to synthetically generate the background image using Monte-Carlo simulation, if desired, but considerable computing time (e.g., days) may be required.

The linear scintillator model A is supplied as a probability transfer matrix that relates (voxel-by-voxel in the scintillator) neutron counts for each incident voxel with each terminal voxel. The probability transfer matrix is generated using Monte-Carlo simulation. The simulation uses data from a suitable data source, such as the Evaluated Nuclear Reaction Data library.

Thus the computer-implemented technique for reversing the cone beam effect uses three components:

MEM algorithm [needs as subroutine inputs Bayesian prior and Probability Transfer Matrix]

Monte-Carlo simulation of the Probability Transfer Matrix

Synthesized "ideal" noiseless background image expressed in the MEM algorithm as the Bayesian prior.

The MEM algorithm, with these other two components attached, then takes as input the observed image y and applies an inversion to generate the reconstructed image x. The reconstructed image x corresponds to the image that would result if an infinitesimally thin scintillator had been used, and thus has the cone beam effects removed.

With this introductory overview in mind, we turn to a detailed discussion of the disclosed technology, beginning with a discussion of the cone beam effect.

Cone Beam Effect

The cone beam effect (CBE) is a generalization of the concept of geometric unsharpness. The effect is dependent on the thickness of the radiation detector used, and the angle formed by the source to detector ray. When the source to detector distance is within an order of magnitude compared to the detector thickness, CBE becomes the prominent factor in image degradation.

Figure 1:
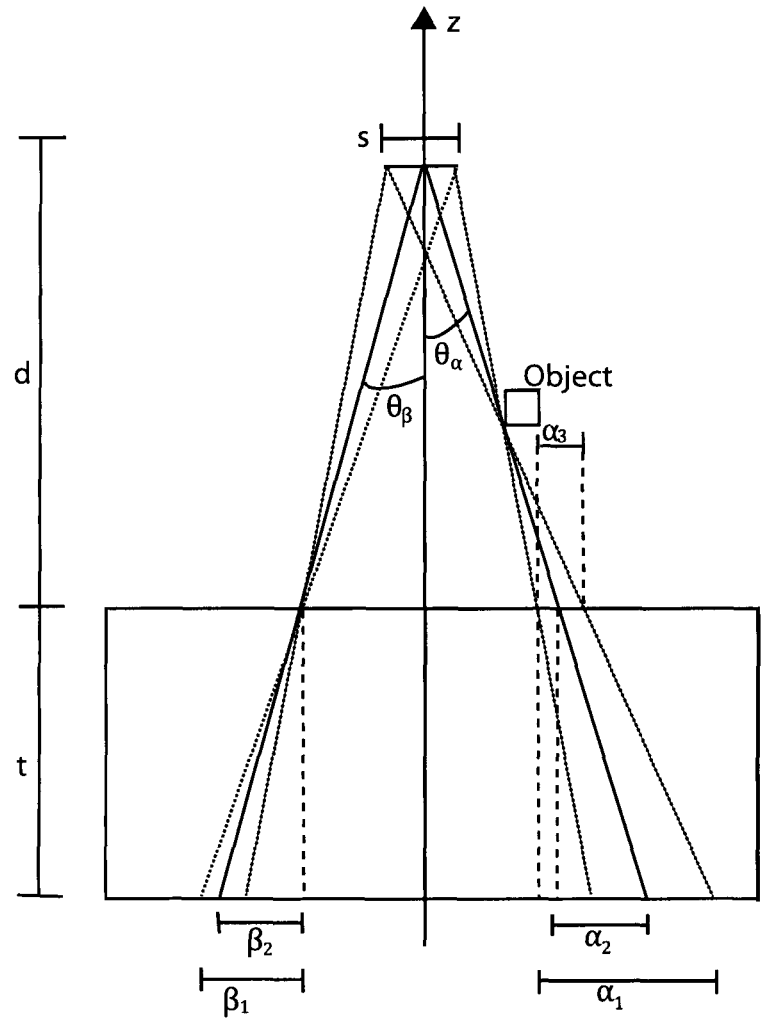
FIG. 1 is a ray trace geometry diagram illustrating the cone beam effect for a feature focused at the detector's surface and for a feature focused away from the detector's surface.
Figure 2:
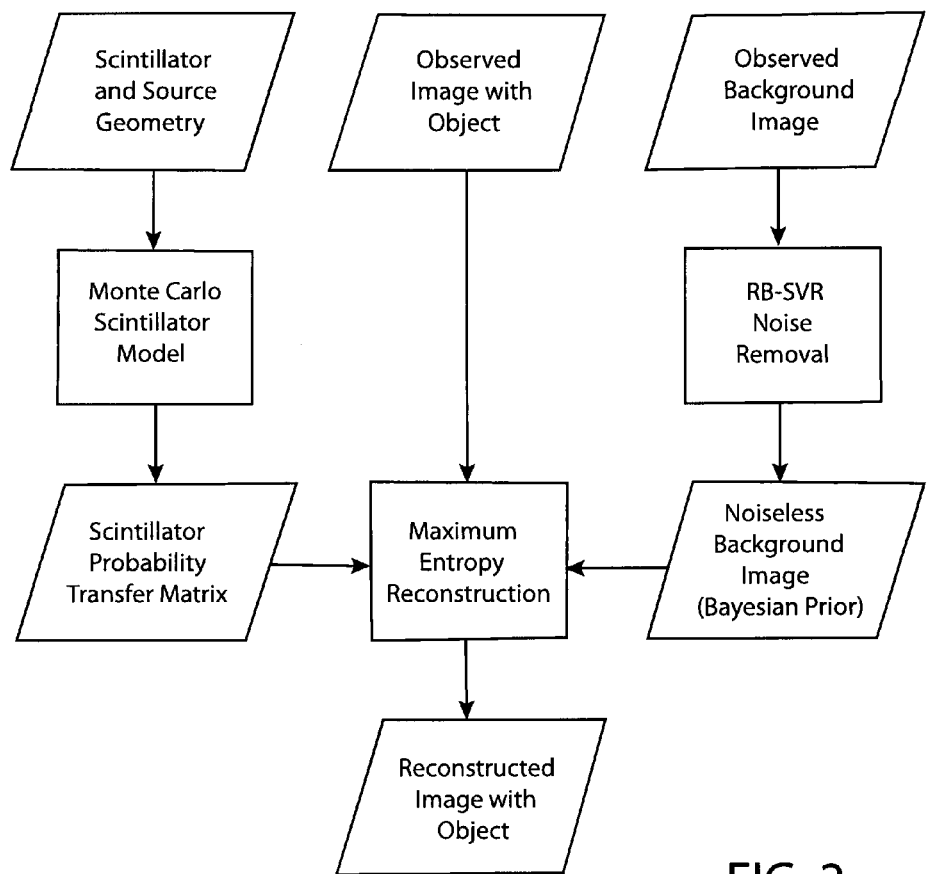
FIG. 2 is a flowchart illustrating the algorithm for computer-generation of a reconstructed image.

As shown in FIG. 1, when source to detector distance, d, and detector thickness, t, are fixed, the CBE can be completely characterized by D, the angle between the ray passing through the entry point and the z axis. Since this angular dependence is rotationally invariant about the z axis, any line from the source to a point on the surface of the detector can be rotated about the z axis to create a cone which is subject to the same blurring effect. It is this conical symmetry which gives this particular geometric unsharpness its name, the cone beam effect.

There are two ways to mitigate the CBE given a fixed d. The first is to reduce the source cross sectional area and for a feature focused at the surface of the detector, we can see this will at most reduce the blur from $\beta_1$ to $\beta_2$. The other approach is to reduce the thickness of the detector and from FIG. 1, we see that this approach will yield an infinitely sharp point, when the detector becomes infinitesimally thin. For a feature not focused at the surface of the vectors, taking d→0 will not recover a completely sharp image $\alpha_3$, but the resulting image quality is still superior to the approach of taking s→0, $\alpha_2$, FIG. 1. Thus, we focus our efforts on removing the primary effect of CBE and create a post processing routine to recover the image taken with an ITS when given an image taken with a detector of finite thickness t.

Having now discussed the cone beam effect, we next present a detailed overview of the disclosed MEM algorithm, as adapted according to our technique.

Algorithm Overview

Our strategy for removing the cone beam effect from the uncollimated images comprises of MEM in conjunction with two supporting subroutines. MEM requires an input of a zero information image for noise suppression purposes and we accomplish this by modeling the ideal background image. Also, MEM requires a linear operator linking the ITS image to the observed image and we compute this operator through a Monte Carlo simulation of the neutron scintillator. Finally, we input the thick scintillator image with both the ideal background image and the linear scintillator model to reconstruct the ITS image.

Algorithm Test Procedures

Figure 3:
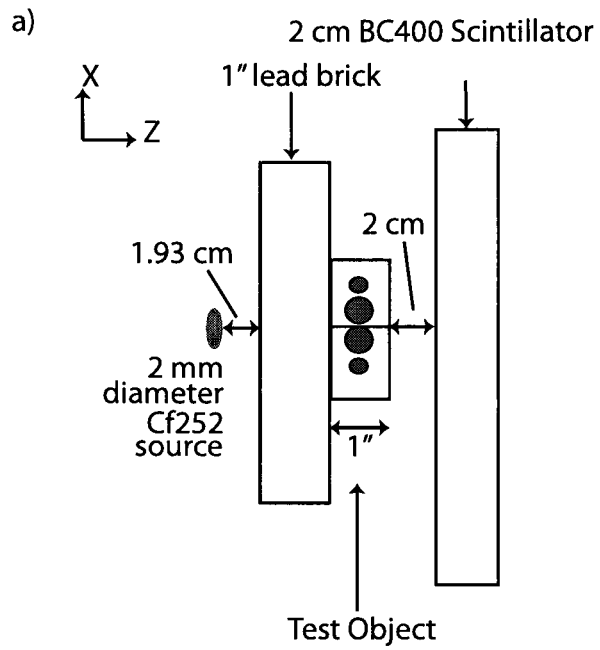
FIG. 3a is a top down view of a Monte-Carlo Neutron Particle (MCNP) model.
FIG. 3b is an expanded view of a test object.
Figure 3:
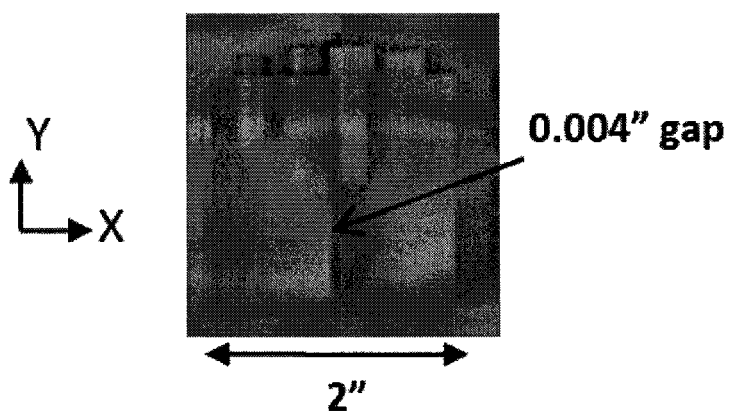

For validation, we tested the algorithm with a typical fast neutron radiography problem that involves a low Z material hidden behind a high Z shield. We used MCNP simulation to generate both the ITS image and the thick scintillator image since MCNP can predict scattering by the high Z shield, the low Z object, and also scattering within the scintillator itself. To allow for future validation, we used realistic geometries and materials which can be readily replicated in a lab setting, FIG. 3.

The simulation setup consists of a Cf-252 source imaging a composite test object placed behind a 1 inch thick lead shield. The test object contained plastics of different densities as well as metal features, FIG. 3b. We purposely kept the source to detector distance small to ensure prominent CBE on the simulated radiographs.

$$P(e_n = x) = \frac{1}{3.37823} e^{(-x/1.025)} \sinh(2.96x) \tag{1}$$

We ran two MCNP simulations, one for the thick scintillator and one for the ITS. In both runs, we used the neutron distribution shown in Eqn. 1, and a 2 mm diameter Cf-252 source. For the 2 cm thick detector, a 500×500 mesh heating tally was imposed on a Bicron BC 400 scintillator with the assumption that the heating tally directly translates the light output of the scintillator. We used this MCNP run as the observed image input for our algorithm, FIG. 4a. We also reran the simulation with the lead shield and test object removed to get a background image, FIG. 4c. For the thick scintillator 1e11 Monte-Carlo neutrons confined to emission angles less than 40 degrees off the z-axis were used for each run.

Figure 4:
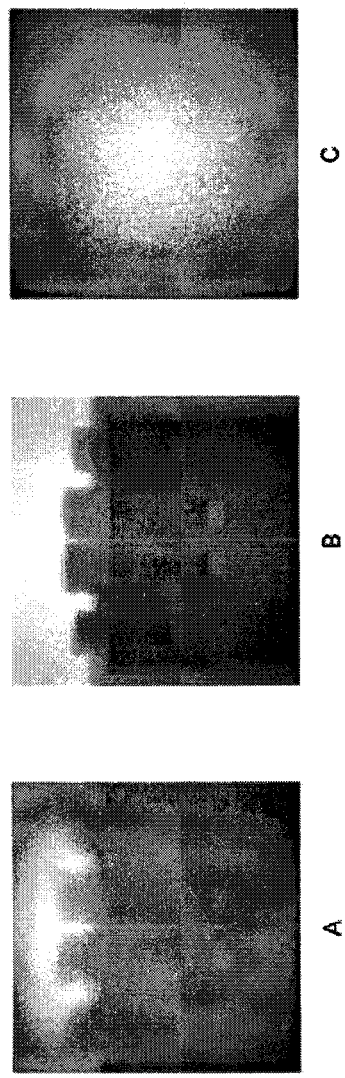
FIG. 4a is an MCNP image with a 2-cm thick scintillator.
FIG. 4b is an MCNP image with the ideal thin scintillator.
FIG. 4c illustrates the MCNP background image.

For the ITS, a 500×500 radiography tally with MCNP's hybrid point detector model, which returns the incident neutron energy flux at each pixel, was used. This resulted in an essentially noiseless image which is shown in FIG. 4b. As this model is essentially noiseless, it can be understood as the ideal detector image when the number of source particles is taken to infinity. With these simulated data, we can test our algorithm by inputting the observed image and seeing how well it reconstructs the ITS image.

Algorithm Implementation

In this section, we describe the maximum entropy method along with its two subroutines in detail.

Maximum Entropy Method

The problem of going from an observed image to an ITS image can be posed as a linear inversion. First, we order the pixels in the observed image (size M×N) from 1 to MN and reformulate the image into a vector based on the ordering. Next, we assume there exists a linear operator relating x, the (MN×1) vector which represents the ITS image, and y, the observed image. We term this linear operator, A. Finally, we are left with a simple linear model relating the ITS image to the observed image, Eqn. 2.

$$Ax = y \quad (2)$$

While Ax=y can be solved via Gaussian-Jordan elimination, in practice we are faced with a noised perturbed version of the original equation, Eqn. 3

$$Ax = y + \epsilon \text{ where } \epsilon \sim N(0, \sigma \cdot I_{MN}) \quad (3)$$

Given the additive noise $\epsilon$, Eqn. 3 is ill posed and requires regularization for a viable solution. Many regularization techniques, such as ridge regression of the L1 loss, have been proposed for this ill posed problem but most lack a sound theoretical basis. Out of these regularization techniques, the maximum entropy method (MEM) stands out because it allows the input of background image or Bayesian prior. MEM uses this Bayesian prior and the observed mage to select a reconstructed image, x, which is most similar to the Bayesian prior while remaining statistically alike to the observed image when transformed with A. To accomplish this, MEM requires these inputs: A, y, $\sigma$ and b, the zero information image. In most imaging applications of MEM, b is assumed to be the background image and here we do the same. We define $b_i$ as the value of the background image for cell i. For numerical purposes, we normalized the background image such that $\Sigma_i b_i = 1$. Additionally, $\sigma$ is a tuning parameter trading off noise suppression versus accuracy in the reconstructed image.

Once the inputs are defined MEM approximates a solution to Eqn. 3 by solving Eqn. 4, which is always guaranteed to be well posed.

$$\operatorname{argmax} S(x_1, \ldots, x_{MN}) = -\sum_i p_i \log\left(\frac{p_i}{b_i}\right) \quad (4)$$

$$\text{s.t.} \sum_{i=1}^{MN} \frac{\left(y_i - \sum_i A_{ij} x_j\right)^2}{\sigma} \leq MN$$

where $$p_i = \frac{x_i}{\sum_j x_j}$$

Eqn. 4 states that the optimal reconstruction is found by maximizing the Shannon entropy of the reconstruction while making sure that the reconstructed image, when operated on by A, is still statistically similar to the observed image. Intuitively, maximizing the Shannon entropy flattens the reconstruction and grants MEM its noise suppression characteristics. Also, the statistical similarity criterion forces the reconstruction to approximately satisfy Eqn. 3 and is what enables MEM to invert A. A derivation of MEM, is given in Appendix B.

In an added note, the Eqn. 4 can be modified in two ways to facilitate operator tuning during real world operations. First, a $\sigma$ matrix can be loaded into memory allowing each $(y_i - \Sigma_i A_{i,j} x_j)$ to be drawn from a Normal distribution of a different variance, $N(0, \sigma_i)$. The change will alter the constraint in Eqn. 4 to below.

$$\sum_{i=1}^{MN} \frac{\left(y_i - \sum_i A_{ij} x_j\right)^2}{\sigma_i} \leq MN$$

This allows the incorporation of information that some pixel counts have more variance than others (i.e. higher regional neutron flux). If less local fine tuning is required, a scalar factor, k, can be added multiplied to the right hand side of the constraint equation to control the amount of global noise suppression vs goodness of fit. The modification is shown below.

$$\sum_{i=1}^{MN} \frac{\left(y_i - \sum_i A_{ij} x_j\right)^2}{\sigma_i} \leq kMN$$

Finally, it should be noted that the second modification is a restriction of the first as setting $\sigma_i = k\sigma$, $\forall i$ will accomplish the same effect as the second modification.

Bayesian Prior Subroutine

Since maximum entropy reconstruction depends heavily on the Bayesian prior to flatten the image, it is crucial that we have an intensity map of the scintillator response for when there is no object of interest. This map also needs to be as smooth as possible as any noise in the Bayesian prior will be magnified in the reconstructed image. We start by noting that the neutron flux is only quasi-radial symmetric because the CF-252 source is not spherical and is large enough to make point particle approximations sufficient.

Figure 5:
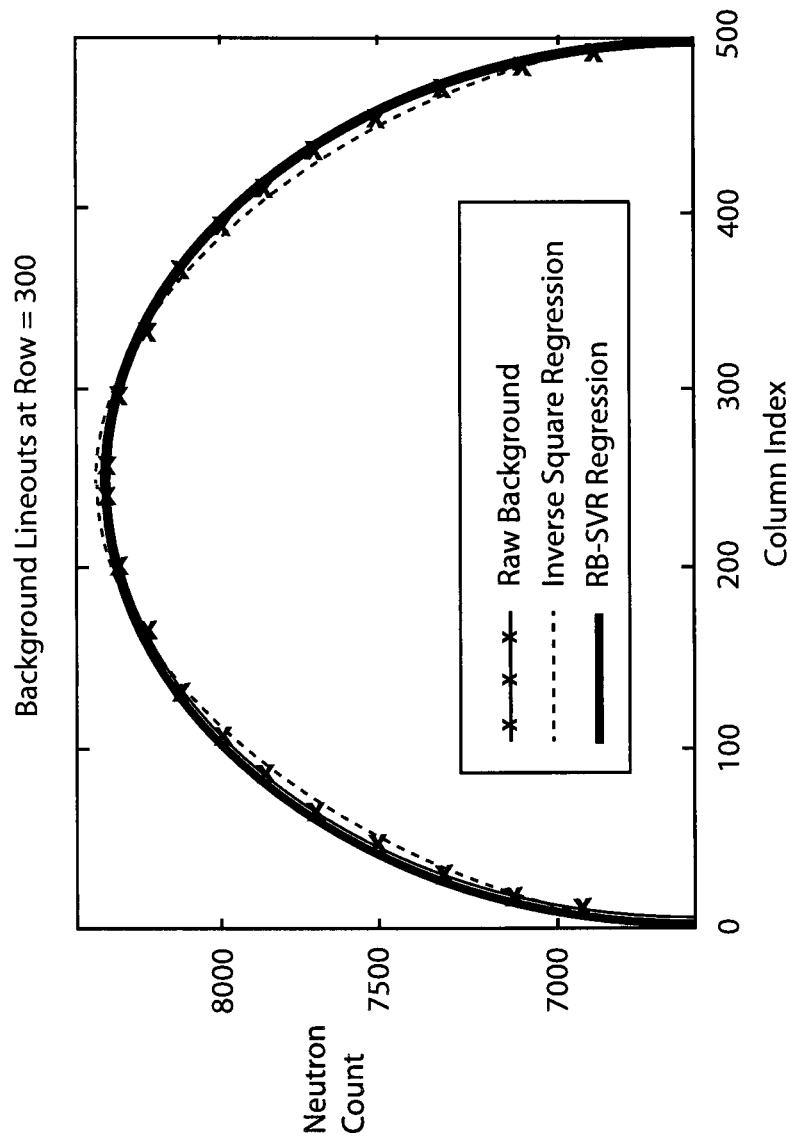
FIG. 5 is a graph providing a comparison of the residual boosted support vector regression (RB-SVR) noise removal versus inverse square law noise removal.

While we can generate a noise-free background image through a Monte-Carlo routine, the amount of simulated particles required for smooth convergence will require many computer days. Also, this approach assumes that the simulation geometry and experimental geometry are one and the same. Any geometrical artifacts from incomplete calibration will result in errors propagating through the reconstruction. As we expect calibration errors to happen when we eventually deploy this technique, we searched for techniques based on smoothing an observed background image. The top two candidates were inverse square regression and residual boosted support vector regression (RB-SVR). Previous work with SVR in image processing showed great success but we found RB-SVR demonstrated better empirical performance, FIG. 5. Thus, we choose RB-SVR as our smoothing algorithm. The RB-SVR algorithm may be implemented using the LIBSVM library. See C. Chang and C. Lin, LIBSVM: a library for support vector machines ACM Transactions on Intelligent Systems and Technology, 2:27:1-27:27, 2011. Software available at http://www.csie.ntu.edu.tw/~cjlin/libsvm. The LIBSVM support vector regression algorithm may be wrapped in the residual boosting module. A derivation of RB-SVR is given in Appendix A.

Linear Scintillator Model

For our linear scintillator model, we opted for a full discrete treatment instead of any continuous approximation. First, we partitioned the scintillator into voxels, volumetric pixels. Next, we assumed that the distance to first interaction of a neutron in the scintillator is an exponential random variable with its mean equal to the mean free path of the neutron. Finally, we assumed that all neutrons give up all their energy on the first interaction so there is no scattering within the scintillator.

Figure 6:
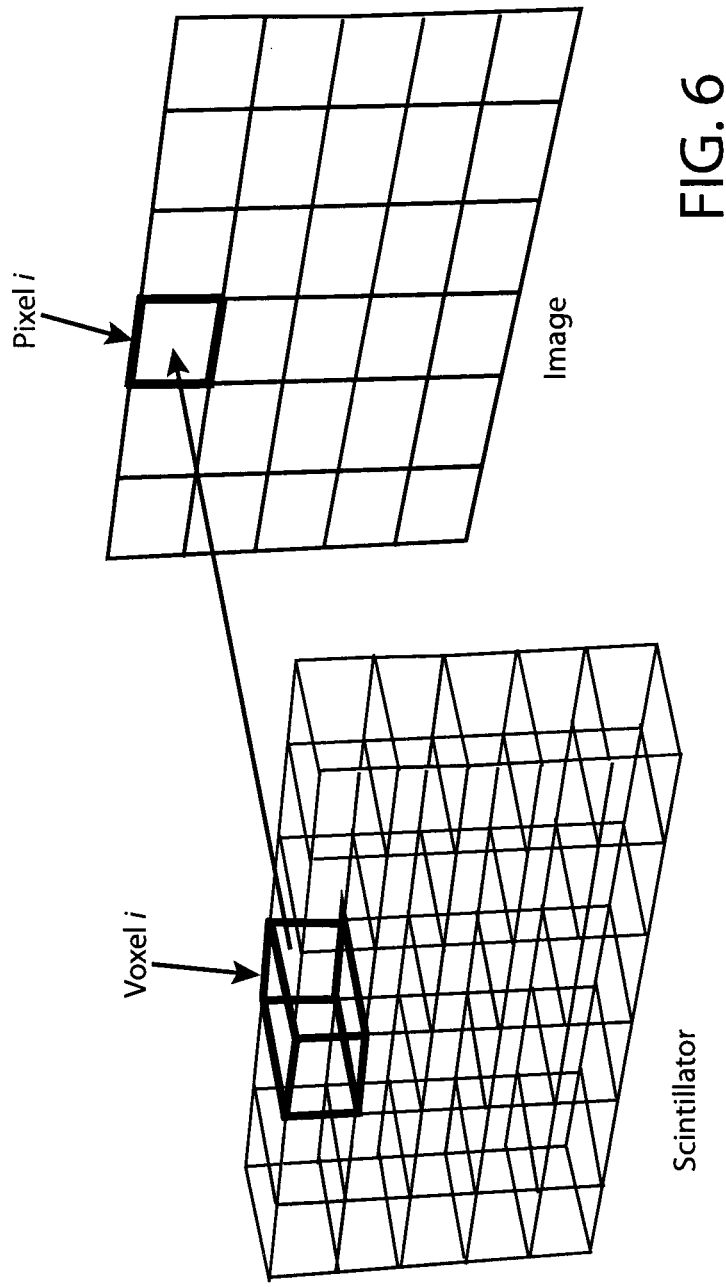
FIG. 6 is a graphical depiction of the bijection between voxel and pixel.

Working off the above assumptions, we defined the bijection between each pixel in the observed image and a voxel on the scintillator, FIG. 6.

If any neutron interacts with the scintillator in voxel i, we assume pixel i increased its intensity count by a constant factor. The prior assumption is justified because each voxel interacts with enough neutrons to ensure central limit convergence, and the ratio of standard deviation of neutron count to mean neutron count is less than 0.05.

In the framework of the discrete voxel scintillator, we wish to solve the number of neutrons incident on each voxel given the number of neutrons terminating in each voxel. Neglecting the intensity variance, the number of incident neutrons is exactly the response of the ideal infinitesimally thin detector. Thus, removing the cone-beam effect is equivalent to solving for the number of incident neutrons.

Probability Transfer Matrix

Figure 7:
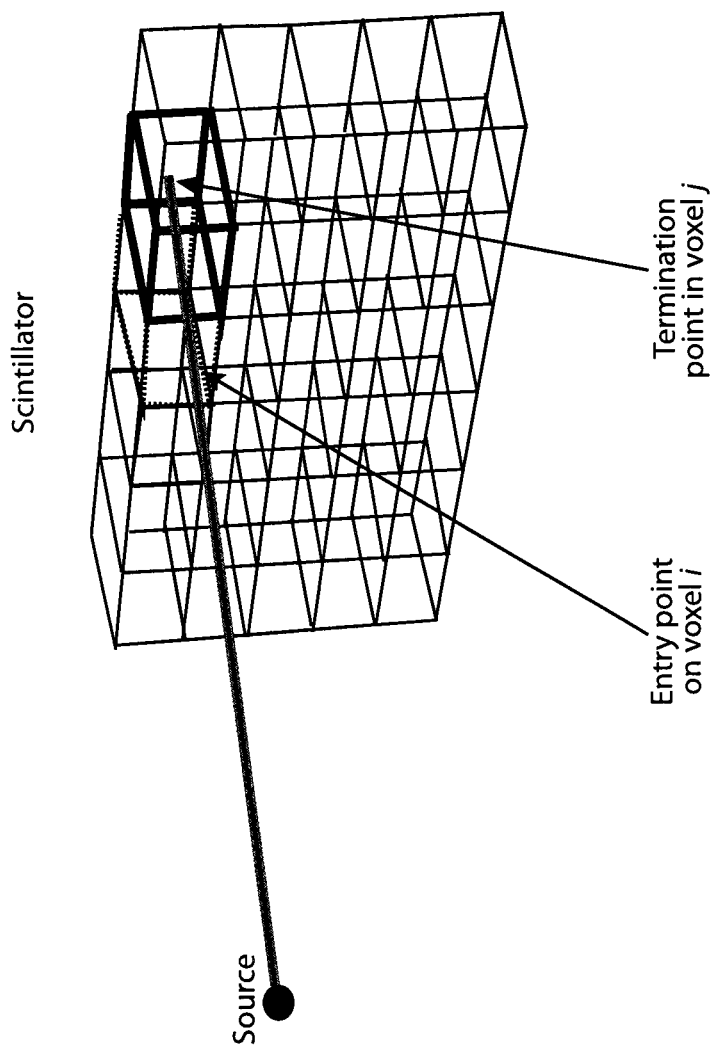
FIG. 7 is a graphical depiction illustrating a neutron incident on voxel I contributing to light output in voxel j.

Given our voxel scintillator model, we now clarify our linear model, Eqn. 2. We redefine x as the vector consisting of the incident counts for each voxel, and y as the vector consisting of the termination counts for each voxel. Now A becomes the probability transfer matrix (PTM) between incident voxel and termination voxel, such that $[A]_{ij}$ denotes the probability a neutron incident on voxel i will terminate in voxel j, FIG. 7.

While A can be determined analytically for certain neutron emission distributions and scintillator compositions, a presently preferred approach obtains A through Monte Carlo simulation, whose pseudocode is listed below and also shown and discussed in connection with FIG. 15.

```
for i = 1 → MN do
    for n = 1 → numNeutrons do
        Sample α_n, the entry point on voxel i's surface
        Sample β_n, the emission point on the sources surface
        Sample e_n, the neutron energy for neutron n
        Calculate λ_n, the mean free path given e_n
        Sample p_n, the penetration distance, given λ_n
        Ray Trace from α_n to β_n and find psi_n, the termination point, given p_n Calculate which voxel j ∋_n
        Add  1/numNeutrons  to [A]_ij end for
end for
```

Figure 8:
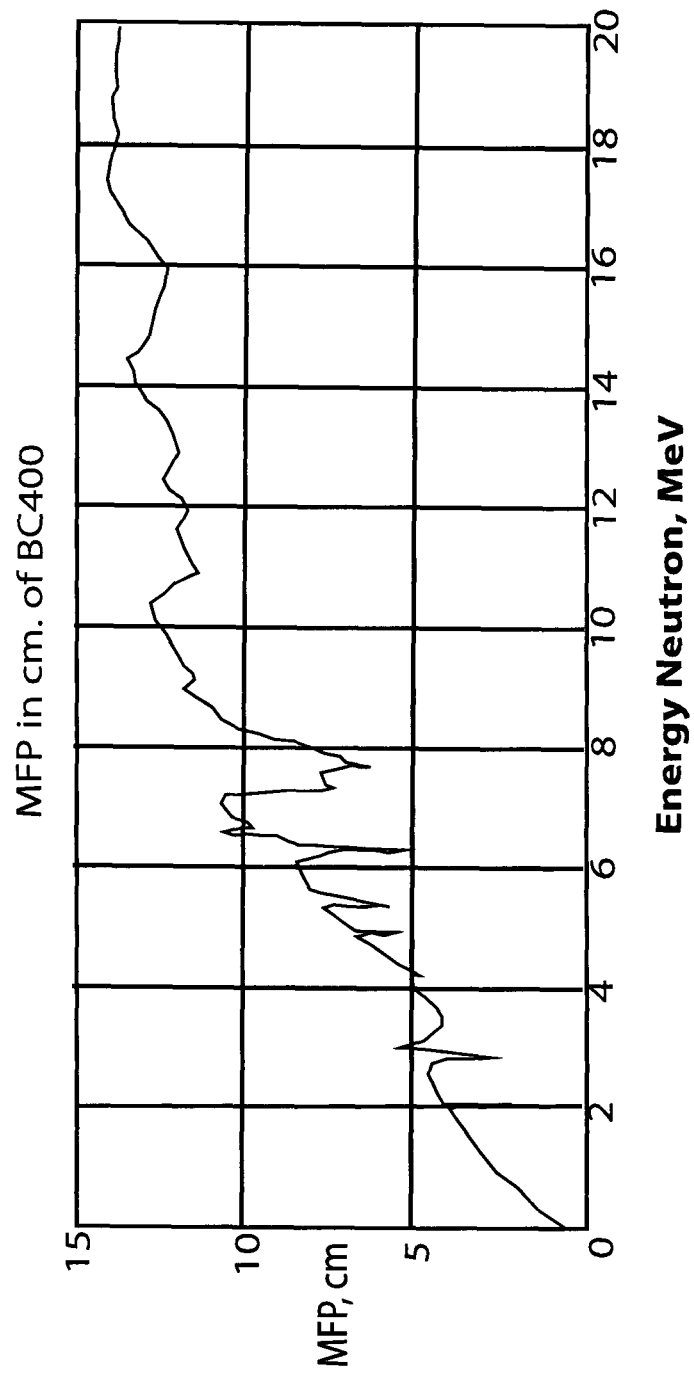
FIG. 8 is a graph depicting the mean free path versus neutron energy for neutrons entering Bicron BC-400.

For sampling the emission energy, $e_n$, we utilized Eqn. 1 and to calculate the mean free path given neutron energy, we utilized the Evaluated Nuclear Reaction Data library, and found the mean free path of neutrons with energy ranging from 1e-10 to 20 MEV in Bicron BC-400 through its molecular formula. We show the mean free path in FIG. 8. Technically, the energy distribution of the neutron incident to the scintillator after passing through the lead shield and the test phantom will not be the same as Eqn. 1 due to spectral hardening. However, looking at FIG. 8, we see that the mean free path of neutrons in BC-400 is roughly flat for energies of 2 MeV to 4 MeV. Since the mean neutron energy of Cf-252 is 2.314 MeV, we see that spectral hardening by the lead shield and the test phantom can shift the mean neutron energy upward by a factor of 2 and still have negligible effect on average mean free path.

Figure 9:
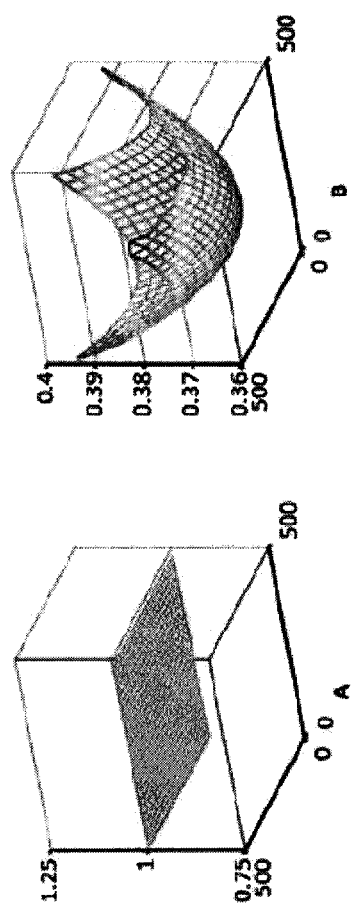
FIGS. 9a and 9b are graphs showing a uniformly flat image before (9a) and after (9b) applying the disclosed linear scintillator model.

Finally, as a check, we applied A to a uniformly flat image. Based on the inverse square law, we expect to see a concave sink extending out from center of the image after transformation, confirmed in FIG. 9.

To demonstrate the effectiveness of our computer-implemented image processing technique, we next present some numerical results obtained through computer simulation, as described below.

Numerical Results

Figure 10:
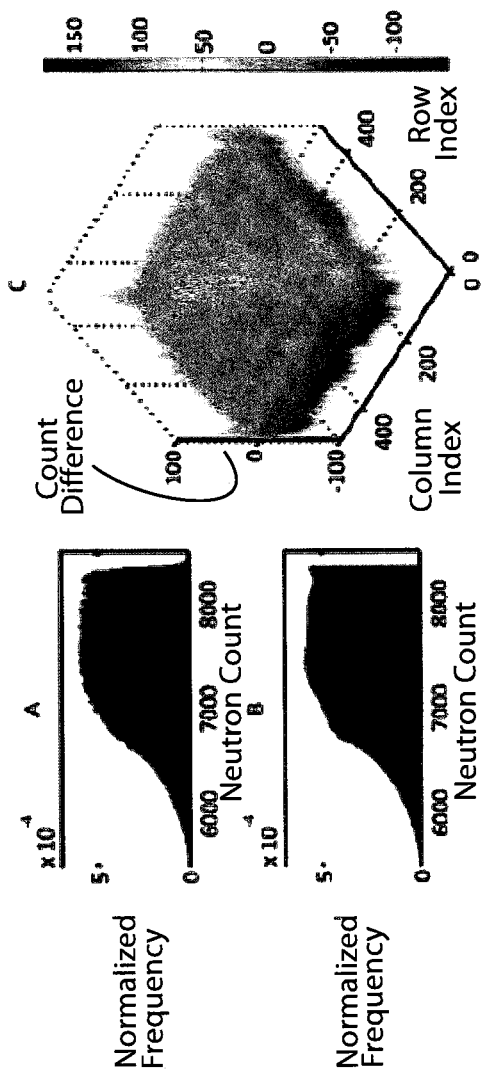
FIG. 10a is a histogram of an MCNP background image's neutron counts per pixel.
FIG. 10b is a histogram of a background image's neutron counts per pixel after residual boosted support vector regression (RB-SVR) processing.
FIG. 10c is a graph showing the difference in neutron counts per pixel between original and RB-SVR processing

First, to estimate the Bayesian prior of the scintillator response with no object, we used MCNP to simulate a background image as discussed above. FIG. 10a shows a histogram of the neutron counts per pixel in FIG. 4c which illustrates the noise in the background image which we have to minimize for the reconstruction. FIG. 10b shows a histogram of the neutron counts per pixel after RB-SVRs estimate of the background image. The uneven landscape of the difference between the two demonstrates the successful noise removal of RB-SVR processing, FIG. 10c.

Next, we generated two versions of the PTM in order to study the effects of Monte Carlo noise on the reconstructions. The first PTM has 2e6 neutrons per voxels and the second PTM has 2e7 neutrons per voxel. Given a desktop Intel I7 950, we were able to simulate 2e6 neutrons per second and build a PTM matrix with numNeutrons set at 2e7 in 140 CPU hours.

Finally, after combining the RB-SVR Bayesian prior and the observed image, we used MEM to reconstruct our estimate of the original image, shown in FIG. 11b and FIG. 11c. The original observed image, FIG. 4a, and the ideal image, FIG. 4b, are reproduced and enlarged in FIGS. 11a and 11d for convenience and ease of comparison. On the same desktop, MEM reconstruction took 20 seconds per image.

Figure 11:
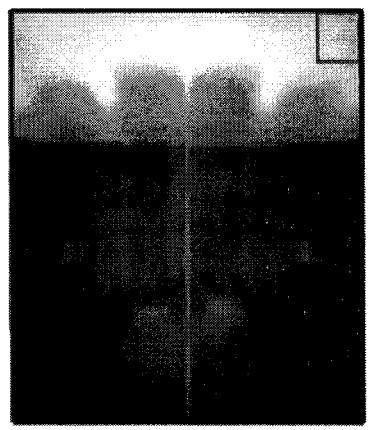
FIG. 11a is a photographic depiction of an MCNP simulated image with finite thick scintillator, and also showing a square region in upper right corner containing pixels from which SNR values are estimated as shown in FIG. 12.
FIG. 11b is a photographic depiction of a restored image with a probability transfer matrix (PTM) built with 2e6 neutrons per voxel.
FIG. 11c is a photographic depiction of a restored image with a PTM built with 2.5e7 neutrons per voxel.
FIG. 11d is an MCNP simulated image with an ideal thin scintillator.
Figure 11:
Figure 11:
Figure 11:
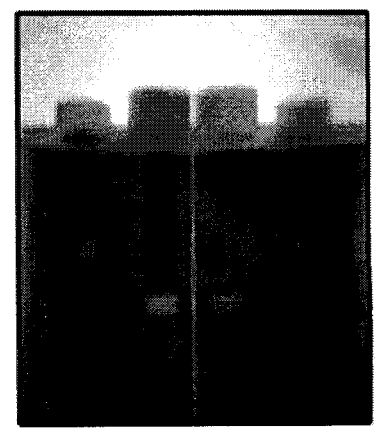

For both reconstructions, we observed suppression of CBE and restoration of hard edges. Comparing FIG. 11b and FIG. 11c, we see that Monte Carlo noise in the probability transfer matrix carries through to image reconstruction. The improvement in reconstruction quality between FIG. 11b and FIG. 11c, is due to the use of an order of magnitude more simulated particles in the construction of FIG. 11 cs pTM.

In this formulation, the reconstructed image is completely defined by the A, b, and σ. We would like to stress that the reconstruction is defined in terms of a global optimization problem and with A, b, and σ fixed, the reconstruction is also completely independent of any initial conditions to the MEM problem. In an effort to explore the robustness of the algorithm to noise, we added increasing levels of Gaussian white noise to FIG. 4a before removing the CBE with our algorithm. For each level of Gaussian noise, we set the reconstruction parameter σ equal to the σ of the Gaussian noise. We measured the degradation effects of the white noise by computing the normalized RMSE between the reconstruction with noise and the reconstruction without noise. We chose normalized RMSE because of its natural interpretation as the average percentage difference between pixel values and define it below.

$$\text{Norm}(x)_i = \frac{x_i}{\max(x)}$$

$$RMSE_{NORM} = \sqrt{\frac{\sum_i^N (\text{Norm}(\hat{x})_i - \text{Norm}(x)_i)^2}{N}}$$

Next, as an objective reference, we estimated the signal to noise ratio SNR for the original image and its corrupted copies. For the estimation, we chose a 50×50 pixel background area in the image, FIG. 4a, and calculated the mean as well as the standard deviation of the neutron counts in the area.

Figure 12:
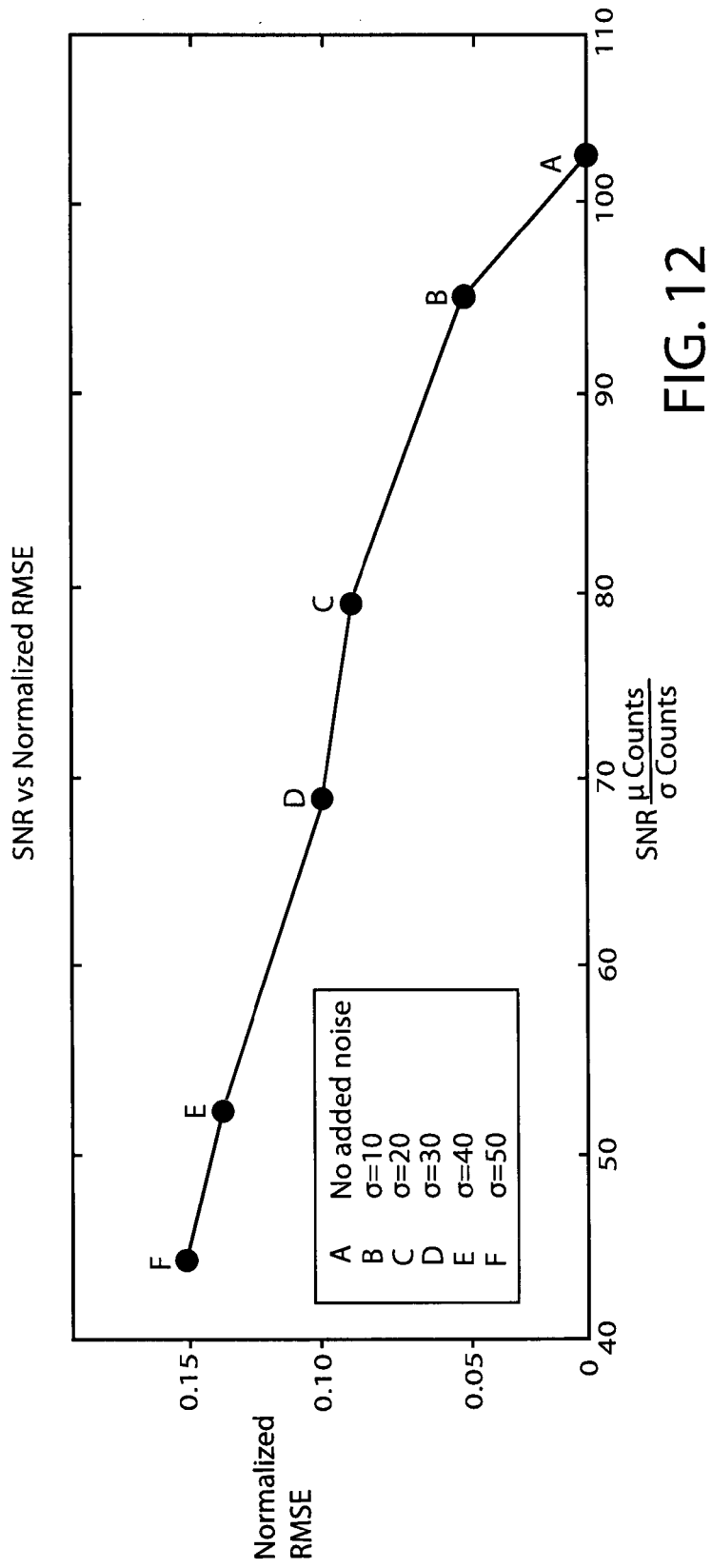
FIG. 12 is a graph showing relationship between root mean square error (RMSE) and signal to noise ratio (SNR)

As shown in FIG. 12, the relationship between RMSE and SNR is approximately linear. Assuming a Poisson emission model for the neutron counts, white noise at the σ=50 level increases variance per pixel by 2500 or 33% (from the average neutron count of 7500). However, this 33% increase in variance only results in a 15% difference in reconstruction value, FIG. 12, demonstrating that the algorithm is robust to modest amounts of noise.

Computer-Implemented Radiography Apparatus

Figure 15:
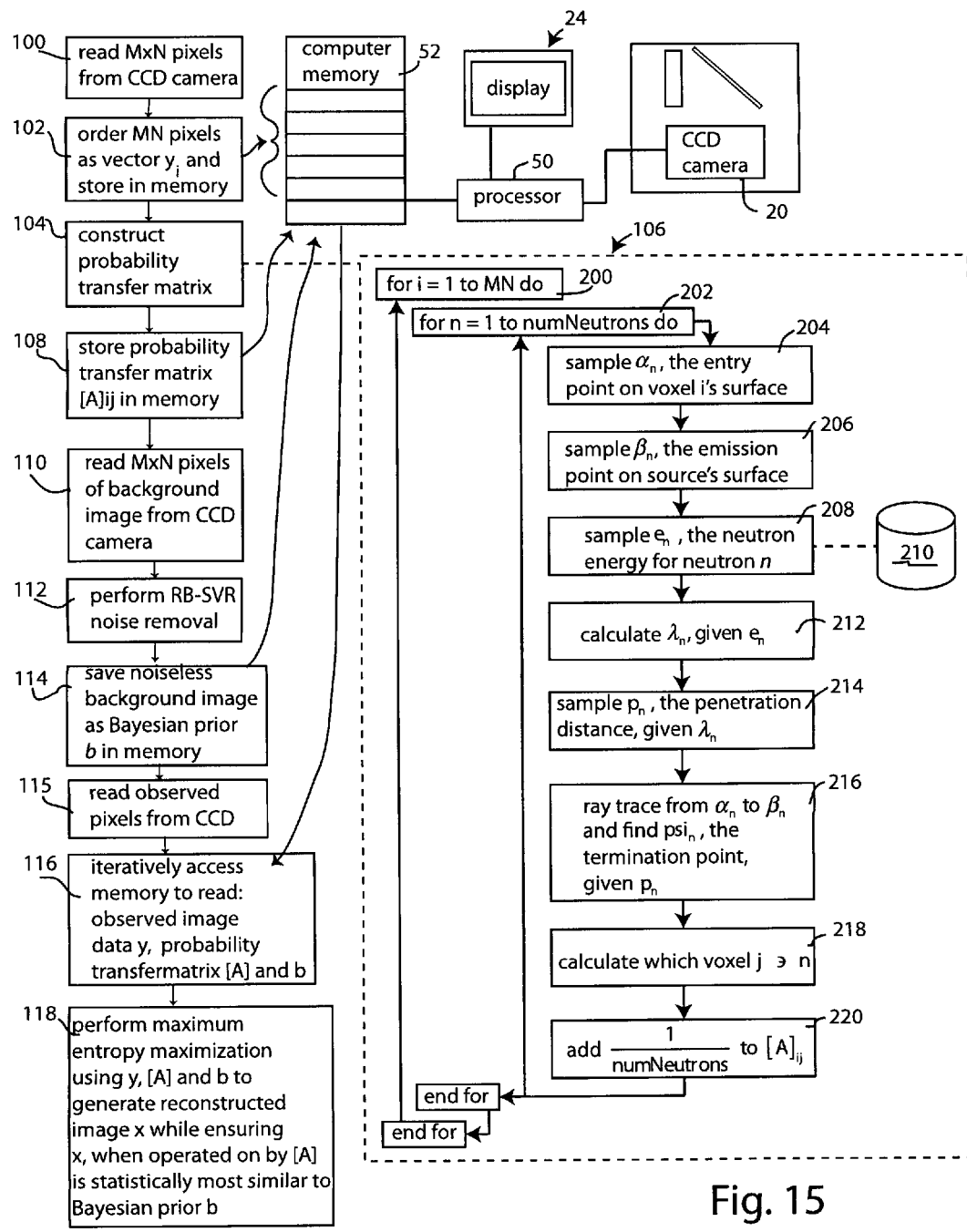
FIG. 15 is a flow chart diagram illustrating how a computer may be programmed to implement the system for uncollimated digital radiography as an apparatus.

Referring to FIG. 15, an exemplary radiography apparatus using the above principles will now be described. The apparatus includes the CCD camera 20 (shown in FIG. 14), which feeds M×N pixel data to the processor 50 for storage in memory 52. Thus the processor 50, at step 100, reads M×N pixel data from the camera and orders the pixel data as individual data values as a vector $y_i$ in memory (step 102). In addition to capturing the observed image data, processor 50 also constructs the probability matrix (step 104) by calling a subroutine shown at 106, the details of which are described below. Processor 50 stores the constructed probability transfer matrix in memory (step 108). The process of generating and storing the probability transfer matrix may be computed and stored in advance of the radiographic analysis of an object of interest.

In addition to storing the probability transfer matrix, the processor also acquires and stores a noiseless background image, used as the Bayesian prior in the MEM algorithm. This may be done by the processor reading M×N pixels of background image data from the CCD camera 20 (step 110). The background image data are acquired without an object of interest being placed in the beam path. The processor then performs an RB-SVR noise removal process on the acquired background data (step 112) and the result is stored in memory at step 114 as the noiseless background image. If desired the processor used to generate the background data may be different from the processor used to generate the probability transfer matrix, and both of these processors may be different from the processor used to analyze the image data from an object of interest. In other words, the probability transfer matrix and background data may be generated by processors other than the processor used to perform the image analysis. These data would be generated ahead of time and downloaded into the memory associated with processor being used to perform the analysis of an object of interest.

To perform the analysis of an object of interest, processor 50 acquires image data from the CCD camera 20, which it stores in memory as at step 115. This data represents the TS observed image data y as described in connection with the discussion of the MEM algorithm above. To perform the MEM algorithm, the processor accesses memory to iteratively read the observed image data value y, the probability transfer matrix value $A_{ij}$ and the Bayesian prior value b, as depicted at step 116. The processor then performs the maximization algorithm (MEM) using these read values to generate a reconstructed image value x, which is stored in memory. The processor applies the MEM algorithm as discussed above, so that the optimal value is chosen for x, given the constraint that x, when operated upon by the probability transfer matrix [A] is statistically most similar to the Bayesian prior b.

Once all values of observed image data y have been processed to generate corresponding optimized values of x, the optimized values are displayed on the display of computer 24. These optimized values correspond to what the image of the object of interest would look like had an infinitesimally thin scintillator (ITS) been used.

The probability transfer matrix plays an important role in obtaining a the ITS image. In a preferred embodiment, the probability transfer matrix is generated by a processor that has been programmed to perform the Monte Carlo simulation steps depicted generally at 106 in FIG. 15. Note that these steps perform two nested loops: an outer loop 200, which iterates through all pixel values (MN) of the CCD camera; and an inner loop 202, which iterates through a predefined number of neutrons (numNeutrons) chosen as a sufficiently large number so that the simulation produces a statistically significant simulation of the actual scintillator and conical beam geometry for the apparatus that has been constructed according to FIG. 14. It may be helpful to refer to FIG. 1, and also FIGS. 6 and 7, which show the geometry being modeled by the Monte Carlo simulation.

The process may be performed by processor 50 (or by another processor) by performing steps 202 through 220, iteratively until all MN pixels have been modeled. Thus at step 204, a value α is measured and stored in memory, corresponding to the point on the voxel surface where the neutron enters the scintillator. Next at step 206, a value β is measured and stored in memory, corresponding to the point from which the neutron was emitted from the source's surface. In this case, the neutron source may be modeled as a point source; or if greater accuracy is desired, the actual size and shape of the source may be taken into account.

For each neutron emitted from β and striking the scintillator surface at α, the energy $e_n$ is obtained and stored. This energy value may be obtained by downloading from a suitable data source 210, such as a data source storing data from the Evaluated Nuclear Reaction Data Library. See A. Trkov, M. Herman, and D. Brown, Endf-6 formats manual, data formats and procedures for the evaluated nuclear data file, endf/b-vi and endf/b-vii, Tech. Rep. BNL-90365-2009, Brookhaven NL, 2011.

Next the processor calculates the mean free path $\lambda_n$ for the obtained energy value $e_n$ at step 212 and the penetration distance $p_n$ is then calculated at step 214. Now, armed with the emission point β, the striking point α the processor performs a ray tracing operation (step 216) to find the termination point given the sample penetration distance $p_n$. The processor then calculates (step 218) which voxel j contains as an element the neutron n and the probability transfer matrix $[A]_{ij}$ is written to storing a probability value [1/numNeutrons] corresponding to the voxel containing the neutron (step 220).

Conclusion

It has been shown by simulation that the cone beam effect can be practically removed from an uncollimated fast neutron image through a simple model of the scintillator response and source to scintillator geometry.

Residual boosted support vector regression was used to smooth the background intensity and large scale Monte Carlo simulation was used to generate a linear approximation of the scintillator response to a near field divergent neutron source. Finally, the maximum entropy method was used to invert the scintillator response from an MCNP simulated observed image.

Overall, the disclosed reconstruction techniques could reduce exposure times or required source intensity without undesirable object blurring on the image by both allowing closer source-to-detector distances to maximize incident radiation flux and the use of thicker scintillators with higher efficiencies. In addition to neutron imaging the technique should also be applicable, with the right probability transfer matrix PTM, for high energy gamma or x-ray radiography using thick scintillators.

The disclosed techniques may be further verified by calibrating an experimental setup which mimics our simulation geometry and applying the algorithm to an empirical image.

In addition, FIG. 11 demonstrated the importance of quality of the probability transfer matrix. A good way to improve the probability transfer matrix quality is to utilize more particles in its construction. Since the Monte-Carlo routine used to generate the probability transfer matrix is parallelizable, the computer-implemented techniques described here may be adapted to run on a high performance computing cluster to quickly generate high quality probability transfer matrices.

As a further aid in understanding the techniques employed herein, the reader may wish to refer to the following Appendices, in which Appendix A describes support vector regression theory (SVR) and Appendix B describes the maximum entropy method (MEM).

APPENDIX A

Support Vector Regression Theory

Support vector regression (SVR) is a machine learning technique which can approximate nonlinear functions.

Given a training set, $T: (x_i, y_i), \ldots, (x_N, y_N) \in R^m \times R$, we wish to approximate a function $f(x_i) \approx y_i$ s.t.

$$f(x) = <\phi(w), \phi(x_i)> + b \tag{A.1}$$

Where $<\bullet, \bullet>$ denotes the inner product and $\phi(x_i)$ is a nonlinear mapping from $R^m$ to a higher dimensional space. The parameters $w$, and $b$ are solved via minimization of the following cost function, $R_f$.

$$\operatorname{argmin} R_f(w, b) = \frac{1}{2} \|w\|^2 + C R_{emp} \tag{A.2}$$

Here, $R_{emp}$ measures empirical risk, $|w|^2$ measures model complexity and C is a regularization parameter which balances model complexity and training set performance. We define $R_{emp}$ as $$R_{emp} = \frac{1}{N} \sum_i^N |y_i - f(x_i)|_\epsilon \tag{A.3}$$

where $|\bullet|_\epsilon$; termed as the $\epsilon$-insensitive loss is defined as $$|y_i - f(x_i)|_\epsilon = \max\{0, |y_i - f(x_i)| - \epsilon\} \tag{A.4}$$

Figure 13:
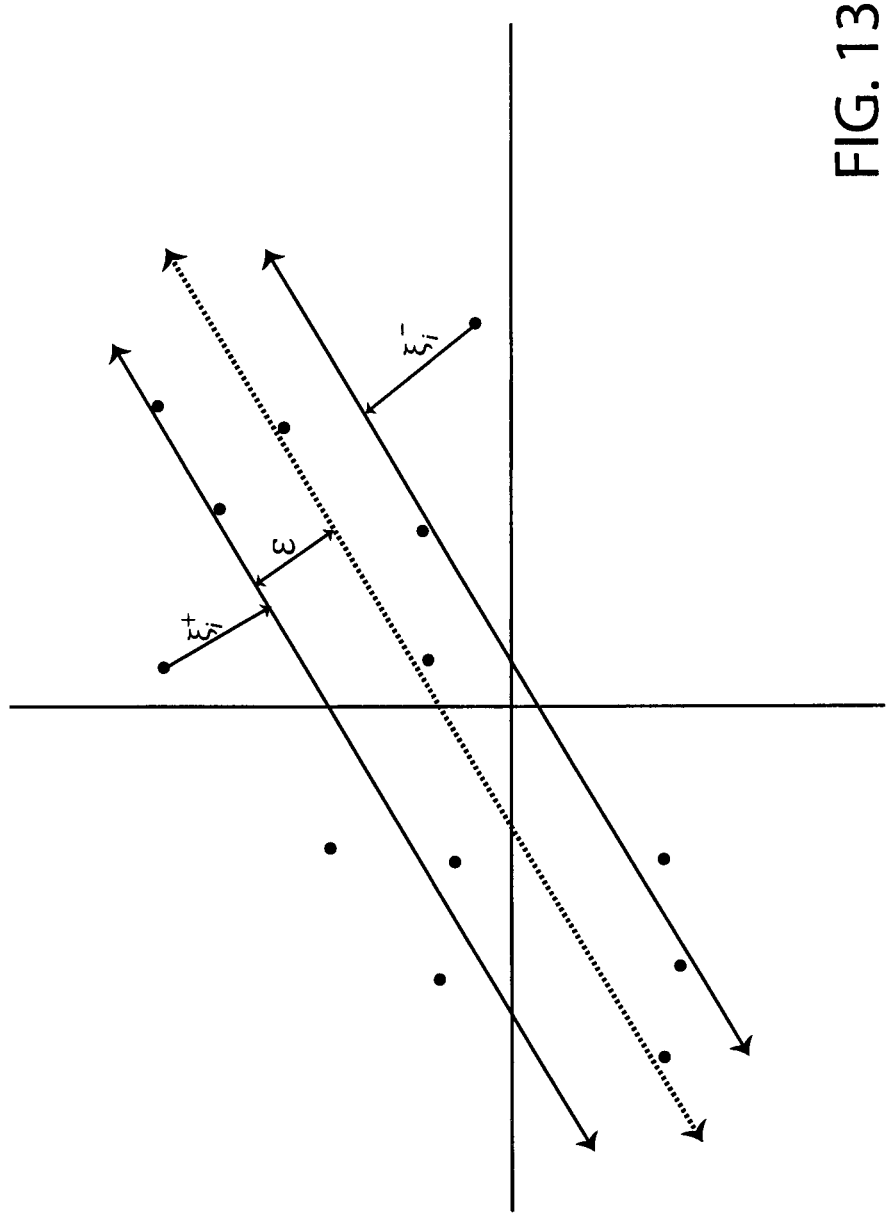
FIG. 13 is a graphical depiction for visualization of a support vector regression (SVR) in two variables, useful for understanding techniques employed in the present disclosure.

Thus, as a result of Eqn. A.4, regression estimates which err by less than a certain amount do not factor into the cost function resulting in an insensitive tube around the regression estimates, FIG. 13.

We wish to reformulate Eqn. A.2 as a quadratic programming problem for tractable computation so we introduce slack variables $\xi_i^+$, and $\xi_i^-$. The two slack variables, $\xi_i^+$, and $\xi_i^-$, measure the deviation of observation i above and below the surface of the $\epsilon$ tube respectively. This formulation is termed the $\epsilon$-SVR.

$$\operatorname{argmin} F(w, b, \xi^-, \xi^+) = \frac{1}{2}\|w\|^2 + \frac{C}{N}\sum_i (\xi_i^+ + \xi_i^-)$$

Subject to $$y_i - f(x_i) \leq \xi_i^+ + \epsilon$$

$$f(x_i) - y_i \leq \epsilon + \xi_i^-$$

$$\xi_i^-, \xi_i^+ \geq 0, i = 1, \ldots, N \tag{A.5}$$

While we now have a well-posed quadratic programming problem, we are required to set the parameter $\epsilon$ a priori. This is unsatisfactory because $\epsilon$ is highly data dependent and can range over $[0, \infty]$. To remove the burden of selecting $\epsilon$, $\nu$-SVR introduces a new parameter $\nu$ and redefines the optimization problem as follows.

$$\operatorname{argmin} F(w, b, \xi^-, \xi^+, \epsilon) = \frac{1}{2}\|w\|^2 + C\left[\nu\epsilon + \frac{1}{N}\sum_i (\xi_i^+ + \xi_i^-)\right]$$

Subject to $$y_i - f(x_i) \leq \xi_i^+ + \epsilon$$

$$f(x_i) - y_i \leq \epsilon + \xi_i^-$$

$$\xi_i^-, \xi_i^+ \geq 0, i = \{1, \ldots, N\} \tag{A.6}$$

Now, $\epsilon$ is a variable featured in the optimization problem and is no longer a parameter. While we have substituted $\nu$ for $\epsilon$, $\nu$ is bounded $\in [0,1]$ and has an intuitive meaning as the maximum fraction of $y_i$'s allowed to err by more than $\epsilon$.

Kernel Functions

Much of the SVR's advantage comes from its projection of data into higher dimensional space, $\phi(\bullet)$. Let $K(x_i, x_j) = <\phi(x_i), \phi(x_j)>$. $K(x_i, x_j)$ is called a kernel function and it provides the benefit of a high dimensional space without explicit computation. For example, the second order polynomial kernel $K_{P2}(x_i, x_j) = (x_i \cdot x_j)^2$ is equivalent to $<\phi(x_i), \phi(x_j)>$ with $\phi: R^2 \to R^3$ s.t.

$$\phi\begin{bmatrix} x \\ y \end{bmatrix} = \begin{bmatrix} x^2 \\ y^2 \\ xy \end{bmatrix}$$

Kernels can also be chosen with a priori knowledge and since we know that the true background intensity map will be smooth, we choose a kernel function which favors smoothness.

$$K(x_i, x_j) = e(-\gamma \|x_i - x_j\|^2) \tag{A.7}$$

This kernel is known as the Gaussian radial basis function (RBF) and the $\phi$ associated with this kernel projects the data into an infinite dimension Hilbert space. However, this kernel also introduces an addition parameter $\gamma$ which must be optimized during training.

Residual Boosting

While $\nu$-SVRs have great native performance, they can be combined through boosting for even better results. In residual boosting, a particular form of ensemble learning, the regression target is iteratively simplified so the machine learner can capture higher order effects in successive iteration.

Residual boosting accomplishes this by defining $t_{i,k}$, the regression target for observation i at iteration k, as $$t_{i,k} = \begin{cases} y_i - \sum_{m=0}^{k-1} f_m(x_i) & \text{if } k > 0 \\ y_i & \text{if } k = 0 \end{cases} \quad \text{(A.8)}$$

Thus, the $k^{th}$ iteration of the machine learner only tries to capture the residuals of the prior k−1 iterations. For the final estimate, we take the sum of all the regression functions, Eqn. A.9.

$$\hat{f}(x_i) = \sum_{n=0}^{K} f_n(x_i) \quad \text{(A.9)}$$

K, the maximum number of boosting iterations, is decided in advance and we found that regression accuracy converge for K>3.

APPENDIX B

Maximum Entropy Method

We now present a detailed discussion of the MEM algorithm used to invert the linear operator [A]. This algorithm has the added bonus of reconstructing the flattest image possible given the observed data, reducing the number of post reconstruction artifacts.

To derive the MEM formulation, we assume that we have K balls (neutrons) and when thrown, each ball is independent and is equally likely to land in any of the MN buckets (boxels). We do not know the actual distribution of the balls among the buckets but the best guess would be the distribution with the highest probability. Since each particular distribution is a realization of a multinomial random variable, we can find the most probable distribution by maximizing the probability of a certain distribution happening.

$$\text{argmax } P(x_1, \ldots, x_{MN}) = \frac{K!}{\prod_{i=1}^{MN} x_i!} \frac{1^{-K}}{MN} \quad \text{(B.1)}$$

Maximizing $P(x_1, \ldots, x_{MN})$ is equivalent to maximizing any monotonic transform of $P(x_1, \ldots, x_{MN})$, so we choose to maximize $$F(x_1, \ldots, x_{MN}) = \frac{1}{K} \log(P(x_1, \ldots, x_{MN})) - \frac{1}{K} \log\left(\frac{1^{-K}}{MN}\right) \quad \text{(B.2)}$$

$$= \frac{1}{K} \log\left(\frac{K!}{\prod x_i}\right)$$

$$= \frac{1}{K}\left[\log(K!) - \sum_{i=1}^{MN} \log(x_i!)\right] \quad \text{(B.3)}$$

Since K~1e18, we can use Sterling's approximation, log(K!)≈K log(K)−K, on Eqn. B.3.

$$= \frac{1}{K}\left[K \log(K) - \sum x_i \log x_i - K + \sum x_i\right] \quad \text{(B.4)}$$

$$= \log(K) - \sum \frac{x_i}{K} \log\left(\frac{x_i}{K} \cdot K\right)$$

$$= \log(K) - \sum \frac{x_i}{K} \log(K) - \sum \frac{x_i}{K} \log\left(\frac{x_i}{K}\right)$$

$$= \left(1 - \sum \frac{x_i}{K}\right) \log(K) - \sum \frac{x_i}{K} \log\left(\frac{x_i}{K}\right)$$

$$= -\sum \frac{x_i}{K} \log\left(\frac{x_i}{K}\right)$$

$$= -\sum p_i \log(p_i)$$

Looking at Eqn. B.4, we see that it is equivalent to the Shannon entropy of a multinomial distribution, Eqn. 18.

$$S_{Shannon} = \sum_{i=1}^{MN} p_i \log(p_i) \quad \text{(B.5)}$$

Thus, we see maximizing the image entropy is equivalent to finding the most probable image. However, we cannot blindly apply the balls and buckets model to our problem as each voxel possesses a different solid angle area, and thus receives different amounts of neutron flux; therefore we modify each $p_i$ in Eqn. B.5 with a Bayesian prior, $b_i$, to correct for the neutron flux difference, Eqn. B.6.

$$= -\sum p_i \log\left(\frac{p_i}{b_i}\right) \quad \text{(B.6)}$$

Looking at Eqn. B.6, we see that unconstructed optimization will simply return the $b_i$s as the reconstructed image. Thus, we add the Chi-Square constraint, Eqn. B.7, to guarantee the reconstructed image is statistically similar to the observed image when linked through the linear operator.

$$\sum_{i=1}^{MN} \frac{\left(y_i - \sum [A]_{ij} x_j\right)^2}{\sigma} \leq MN \quad \text{(B.7)}$$

Combining Eqn. B.6 and Eqn. B.7, we arrive at the full formulation of MEM.

$$\text{argmax} - \sum p_i \log\left(\frac{p_i}{b_i}\right) \quad \text{(B.8)}$$

s.t.

$$\sum_{i=1}^{MN} \frac{\left(y_i - \sum [A]_{ij} x_j\right)^2}{\sigma} \leq MN$$

To solve Eqn. B.8, a large scale convex optimization problem involving MN variables, iterative preconditioned gradient descent or quasi-Newton methods can be used. For brevity, we will not restate the various numerical algorithms.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A digital radiographic imaging system, comprising:
an uncollimated radiation source adapted to produce a substantially conical profile radiation beam directed at an object/space to be imaged;
a radiation converter adapted to be positioned adjacent the object/space opposite the radiation source and to convert incident radiation into a different form of radiation representing an observed image of the object/space;
a digital image recorder operably connected to the radiation converter to digitally record the observed image; and
a computerized system adapted to reconstruct the observed image as a deblurred image that substantially compensates for the conical profile of the radiation beam, by inverting a predetermined conical blurring model (that is based on the geometries of the radiation source and radiation converter, and represented by the probability transfer matrix) on the digitally recorded observed image using the maximum entropy method (MEM), wherein the conical blurring model is used as the linear operator of interest and a smoothed background image pre-recorded by the digital image recorder is used as a Bayesian prior.

2. The digital radiographic imaging system of claim 1, further comprising output means for displaying the deblurred image.

3. A digital radiographic imaging method, comprising:
directing a substantially conical profile radiation beam from an uncollimated radiation source to an object/space to be imaged;
using a radiation converter positioned adjacent the object/space opposite the radiation source to convert incident radiation into a different form of radiation representing an observed image of the object/space;
using a digital image recorder to digitally record the observed image; and
reconstructing the observed image as a deblurred image that substantially compensates for the conical profile of the radiation beam, by inverting a predetermined conical blurring model (that is based on the geometries of the radiation source and radiation converter) on the observed image using the maximum entropy method (MEM) by treating the conical blurring model as the linear operator of interest and a smoothed background image pre-recorded by the digital image recorder as a Bayesian prior.

4. The digital radiographic imaging method, of claim 3, further comprising displaying the deblurred image.

5. A computer system for deblurring digital images produced in uncollimated digital radiographic imaging systems, comprising:
data input means adapted to receive an observed image of an object/space that was digitally recorded by a digital image recorder from a second type of radiation produced by a radiation converter upon the incidence of a first type of radiation from a substantially conical radiation beam directed at an object/space from an uncollimated first type radiation source; and
a data processing module adapted to reconstruct the observed image as a deblurred image that substantially compensates for the conical profile of the radiation beam, by inverting a predetermined conical blurring model (that is based on the geometries of the radiation source and radiation converter, and represented by the probability transfer matrix) on the digitally recorded observed image using the maximum entropy method (MEM), wherein the conical blurring model is used as the linear operator of interest and a smoothed background image pre-recorded by the digital image recorder is used as a Bayesian prior.

6. The computer system of claim 5,
further comprising output means for displaying the deblurred image.

7. A method in a computer system for deblurring digital images produced in uncollimated digital radiographic imaging systems, comprising:
receiving an observed image of an object/space that was digitally recorded by a digital image recorder from second type of radiation produced by a radiation converter upon the incidence of a first type of radiation from a substantially conical profile radiation beam directed at an object/space from an uncollimated radiation source; and
reconstructing the observed image as a deblurred image that substantially compensates for the conical profile of the radiation beam, by inverting a predetermined conical blurring model (that is based on the geometries of the radiation source and radiation converter) on the observed image using the maximum entropy method (MEM) by treating the conical blurring model as the linear operator of interest and a smoothed background image pre-recorded by the digital image recorder as a Bayesian prior.

8. The method of claim 7,
further comprising displaying the deblurred image.

9. A processor-implemented image deblurring apparatus to deblur and present for display an observed image produced by a high energy radiation source that projects a substantially conical beam through a target and onto a scintillator, the scintillator when irradiated without target producing an observed background image, the image deblurring apparatus comprising:
a camera configured to capture an image of the target from said scintillator and to record as observation data;
processor readable memory storing a transfer matrix that expresses the scintillator-source geometry;
said memory further storing background image data corresponding to said observed background image;
a processor coupled to receive said observation data from the camera;
the processor configured to access said memory and programmed to read the transfer matrix and the stored background image data and to operate on said received observation data by applying said transfer matrix to generate image reconstruction data that are constrained by the stored background image data to statistically maximize the similarity to the background image data; and
a port coupled to the processor through which the image reconstruction data are supplied for display of the deblurred observed image.

10. The apparatus of claim 9 wherein said processor is programmed to apply a maximum entropy method reconstruction of the observation data to thereby generate the image reconstruction data.

11. The apparatus of claim 10 wherein said processor is programmed to process the observed background image data as a Bayesian prior used by the maximum entropy method reconstruction.

12. The apparatus of claim 9 further comprising a processor programmed to generate the transfer matrix by employing a Monte-Carlo simulation based on the scintillator-source geometry.

13. The apparatus of claim 9 further comprising a processor programmed to apply a smoothing algorithm to the background image data.

14. The apparatus of claim 13 wherein the smoothing algorithm is a residual boosted-support vector regression algorithm.

15. The apparatus of claim 9 further comprising a processor programmed to generate the transfer matrix by performing ray tracing between an emission point from the radiation source and an entry point into the scintillator.

16. The apparatus of claim 9 further comprising a processor programmed to generate the transfer matrix by utilizing stored data indicative of particle energy of the radiation source to determine penetration distance as one factor expressed by the scintillator-source geometry.

17. The apparatus of claim 9 wherein the processor is programmed to apply the transfer matrix to generate image reconstruction data that corresponds to an image of the target as rendered by an infinitesimally thin scintillator.

18. The apparatus of claim 9 wherein the transfer matrix comprises a probabilistic model that relates the observed image to an image as seen through an infinitesimally thin scintillator and is inverted on the infinitesimally thin scintillator image using maximum entropy method.

19. A method of deblurring an observed image produced by a high energy radiation source that projects a substantially conical beam through a target and onto a scintillator producing observation data, the scintillator when irradiated without target producing an observed background image, the image deblurring apparatus comprising:
   storing in processor readable memory a transfer matrix that expresses the scintillator-source geometry;
   storing in said memory background image data corresponding to said observed background image;
   using a processor (a) to receive the observation data as an observed image, (b) to access the memory to read the transfer matrix and the stored background image data and (c) to operate on said received observation data by applying said transfer matrix to generate image reconstruction data that are constrained by the stored background image data to statistically maximize the similarity to the background image data and thereby deblurring the observed image.

20. The method of claim 19 wherein the processor operates on said received observation data by applying a maximum entropy method reconstruction of the observation data to thereby generate the image reconstruction data.

21. The method of claim 20 further comprising using the processor to process the observed background image data as a Bayesian prior used by the maximum entropy method reconstruction.

22. The method of claim 19 further comprising using a processor to generate the transfer matrix by employing a Monte-Carlo simulation based on the scintillator-source geometry.

23. The method of claim 19 further comprising using a processor to apply a smoothing algorithm to the background image data.

24. The method of claim 23 wherein the smoothing algorithm is a residual boosted-support vector regression algorithm.

25. The method of claim 19 further comprising using a processor to generate the transfer matrix by performing ray tracing between an emission point from the radiation source and an entry point into the scintillator.

26. The method of claim 19 further comprising using a processor to generate the transfer matrix by utilizing stored data indicative of particle energy of the radiation source to determine penetration distance as one factor expressed by the scintillator-source geometry.

27. The method of claim 19 further comprising using the processor to apply the transfer matrix to generate image reconstruction data that corresponds to an image of the target as rendered by an infinitesimally thin scintillator.

28. The method of claim 19 wherein the transfer matrix comprises a probabilistic model that relates the observed image to an image as seen through an infinitesimally thin scintillator and is inverted on the infinitesimally thin scintillator image using maximum entropy method.

* * * * *